United States Patent [19]
Glaesener

[11] Patent Number: 6,120,724
[45] Date of Patent: Sep. 19, 2000

[54] APPARATUS AND METHOD FOR CLAMPING A MOLD

[75] Inventor: Pierre Glaesener, Bissen, Luxembourg

[73] Assignee: Husky Injection Molding Systems, Ltd., Canada

[21] Appl. No.: 09/137,061

[22] Filed: Aug. 20, 1998

[51] Int. Cl.[7] .................................................. B29C 45/64
[52] U.S. Cl. ...................... 264/334; 264/328.1; 425/589; 425/595; 425/441
[58] Field of Search ................................. 264/328.1, 334; 425/589, 590, 595, 441, 450.1, 451.2

[56] References Cited

U.S. PATENT DOCUMENTS

| | | | |
|---|---|---|---|
| 4,846,664 | 7/1989 | Hehl | 425/589 |
| 4,874,309 | 10/1989 | Kushibe et al. | |
| 5,052,910 | 10/1991 | Hehl | 425/589 |
| 5,135,385 | 8/1992 | Fukuzawa et al. | |
| 5,238,394 | 8/1993 | Hirata | |
| 5,275,550 | 1/1994 | Romi | |
| 5,302,108 | 4/1994 | Wohlrab | 425/589 |
| 5,547,366 | 8/1996 | Hehl | 425/589 |
| 5,620,723 | 4/1997 | Glaesener et al. | |
| 5,624,695 | 4/1997 | Glaesener et al. | |
| 5,645,875 | 7/1997 | Glaesener et al. | |
| 5,674,541 | 10/1997 | Svoboda | 425/589 |
| 5,753,153 | 5/1998 | Choi | |
| 5,753,280 | 5/1998 | Coxhead | |
| 5,773,050 | 6/1998 | Wohlrab | 425/589 |

*Primary Examiner*—James P. Mackey
*Attorney, Agent, or Firm*—Bachman & LaPointe, P.C.

[57] ABSTRACT

A mold stroke force is applied to the movable platen to move same between the mold open and mold closed position and from the mold closed to the mold open position. A mold break force is applied to the movable platen in the mold closed position to break open the mold. The mold stroke cylinder for applying a mold stroke force acts inside the mold stroke cylinder for applying a mold break force.

14 Claims, 3 Drawing Sheets

APPARATUS AND METHOD FOR CLAMPING A MOLD

BACKGROUND OF THE INVENTION

The present invention relates to a molding machine with a stationary platen and a movable platen which combines the functions of mold break and clamp stroke (opening and closing the movable platen) in one unit. The advantages of this system include faster mold break action and reduced overall build length of the clamp assembly.

Injection molding machines are well known which include securing and clamping assemblies, such as for use with the tiebars of both singular and tandem injection molding machines. Thus, the prior art includes many types of tiebar gripping and clamping assemblies for use with injection molding machines. The gripping of the tiebars via these assemblies allows for a high clamping force to be applied to the mold halves during injection molding. For example, typical tie bar gripping and mold clamping mechanisms are shown in the patents to Fukuzawa et al. U.S. Pat. No. 5,135,385; Romi U.S. Pat. No. 5,275,550; Hirata U.S. Pat. No. 5,238,394; and Kushibe et al. U.S. Pat. 4,874,309. In each of these patents a tiebar gripping mechanism and mold clamping unit is disclosed where the tiebar is gripped by clamping devices.

The requirement for forcing open a mold is well known. After filling a closed and clamped injection mold with plastic, the plastic inside the mold is cooled and the cooling of the plastic causes the plastic to shrink to the mold core. Sometimes a considerable force, for example, up to 10% of the mold's required clamping force, is required to break open the mold. This initial motion overcomes the sticking force or stiction that prevents the initial opening of the mold. Once mold break is achieved, or the mold is broken, the mold can easily be opened the remainder of the required stroke obtained. Thus, there is a need for a significant initial mold opening or mold break force and short mold opening movement when opening the mold.

Two platen clamps have typically provided this mold break force with a separate, dedicated cylinder acting directly on the tiebar ends, as shown for example in German Patent 3034024, or by using the mold clamping force in reverse as shown in U.S. Pat. 5,645,875 to Glaesener et al.

Other methods to accomplish this include making the clamp stroke cylinders, usually separate from the clamping cylinders, large enough to provide the required mold break force. However, this requires using a larger diameter cylinder than would be necessary to move the platen which is inconvenient and cumbersome.

Accordingly, it is a principal object of the present invention to provide an improved apparatus and process for clamping a mold.

It is a further object of the present invention to provide an apparatus and process as aforesaid that conveniently and expeditiously applies mold stroke force and mold break force, including fast mold break action and reduced overall build length of the clamp assembly.

Further objects and advantages of the present invention will appear hereinbelow.

SUMMARY OF THE INVENTION

In accordance with the present invention, the foregoing objects and advantages are readily obtained.

The apparatus of the present invention comprises: a stationary and movable platen, with a mold half affixed to each, reciprocably movable between a mold open and mold closed position and between a mold closed and mold open position; means for applying a mold stroke force to the movable platen to move the movable platen between a mold open and mold closed position, and between the mold closed and mold open position; means separate from the means for applying a mold stroke force for applying a mold break force to said movable platen in the mold closed position to break open the mold; and wherein the means for applying a mold stroke force acts inside the means for applying a mold break force. Thus, the mold break cylinder and the mold stroke cylinder are desirably concentric and coaxial.

The process of the present invention comprises: providing a stationary and movable platen, with a mold half affixed to each, reciprocably movable between a mold open and a mold closed position and between a mold closed and mold open position; applying a mold stroke force to said movable platen by a mold stroke cylinder to move the movable platen between the mold open and mold closed position and between the mold closed and mold open position; applying a mold break force to said movable platen by a mold break cylinder in the mold closed position to break open the mold; and positioning the mold stroke cylinder and the mold break cylinder so that the mold stroke cylinder acts inside the mold break cylinder.

Further features and advantages of the present invention will appear hereinbelow.

BRIEF DESCRIPTION OF THE DRAWINGS

The details of the present invention are described in the accompanying exemplificative drawings, wherein.

DETAILED DESCRIPTION OF PREFERRED EMBODIMENTS

Figure 1:
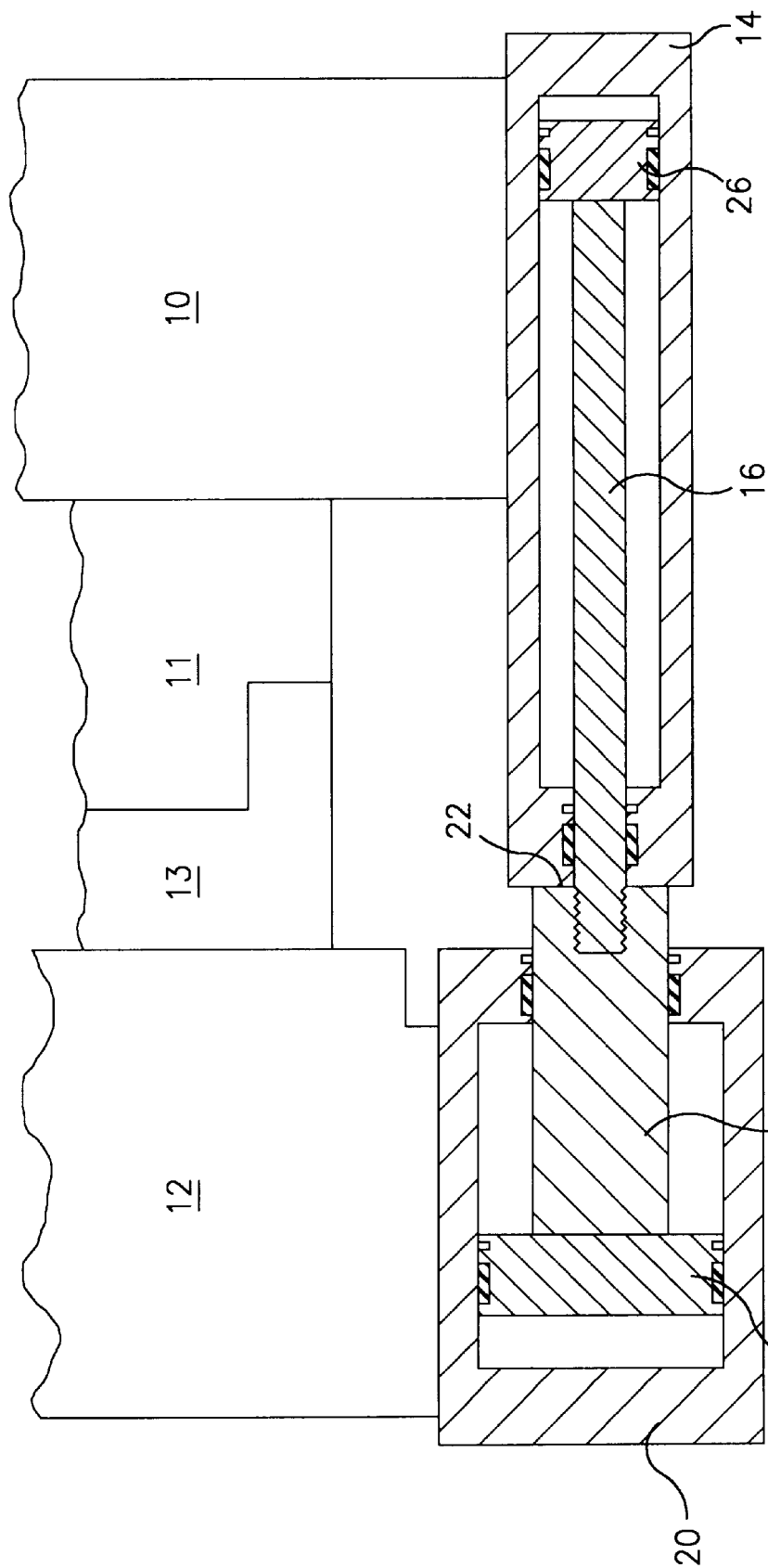
FIG. 1 is a partial sectional side view of a prior art device.

The prior art device of FIG. 1 shows a two platen clamp which includes stationary platen 10 and moving platen 12 connected by tiebars (not shown) and including mold halves 11 and 13 affixed to each platen which together form one or more molds. Mold stroke cylinder 14 is mounted to the stationary platen 10 and has a rod 16 connected to rod 18 of a mold break cylinder 20 that is mounted to the movable platen 12. The diameter of rod 18 is larger than the diameter of rod 16 so that part of the end of rod 18 can push against the end wall 22 of cylinder 14. Thus, the diameter of piston 24 in break cylinder 20 is sized to provide sufficient break force while the diameter of piston 26 in stroke cylinder 14 is sized to provide sufficient force to move the movable platen 12 and its corresponding mold half. Both cylinder sizes can therefore be optimized in diameter to operate at maximum efficiency. One disadvantage of this system is that the build length of the assembly as well as the stroke of both cylinders are added in series.

Figure 2:
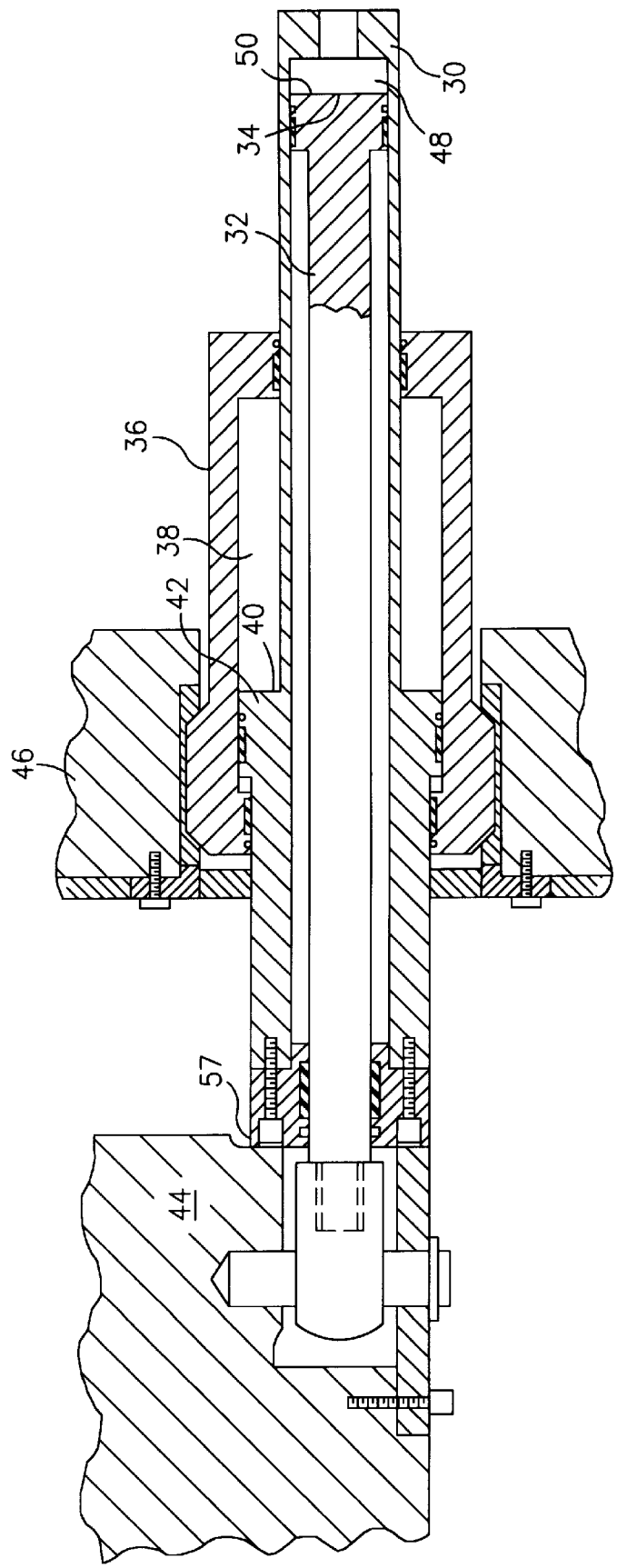
FIG. 2 is a partial sectional side view of the device of the present invention.

Referring to the present invention as shown in FIG. 2, the mold stroke cylinder 30 includes rod portion 32 and piston portion 34 that themselves act inside the mold break cylinder 36. Thus, the strokes of the mold stroke cylinder 30 and the mold break cylinder 36 are in parallel and are not additive in the build length.

Thus, in operation with the mold closed, high pressure oil is directed into mold break cylinder 36 at space 38 causing a force to be applied to mold break piston face 40 of piston 42 of break cylinder 36. This force is directed through the thick walled mold break cylinder 36 to act directly on moving platen 44 which is spaced from stationary platen 46, thus moving the moving platen 44 and forcing the attached mold or molds to break open. High pressure oil is then directed to the cap side 48 of rod 32 in stroke cylinder 30 which causes movable platen 44 to move further thus continuing opening the mold.

Break cylinder 36 has sufficient stroke to accommodate the shutheight range of the clamp. Also, because the diameter of piston face 40 of piston 42 of break cylinder 36 is greater than that of piston face 50 of stroke piston 34, the position of piston face 40 will not change inside mold break cylinder 36 during stroke action of rod 32. During the stroke motion of rod 32, oil is piped regeneratively for efficiency.

Figure 3:
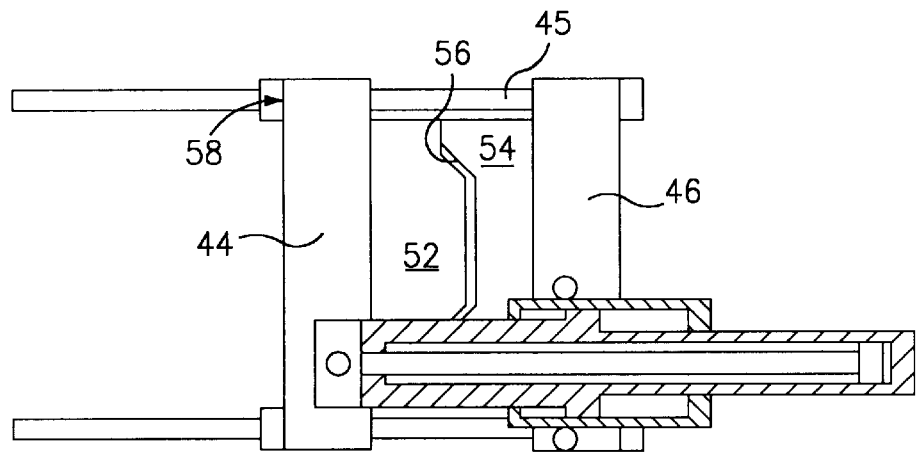
FIGS. 3, 4 and 5 are side views showing different platen positions.
Figure 4:
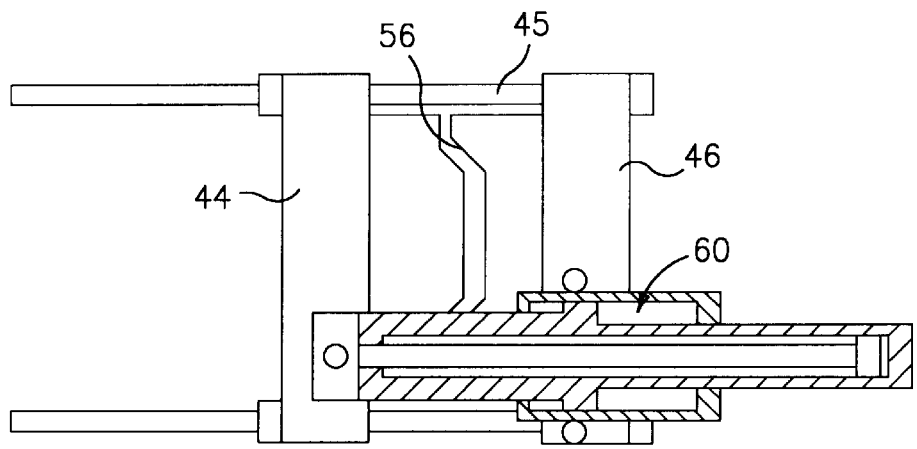
Figure 5:
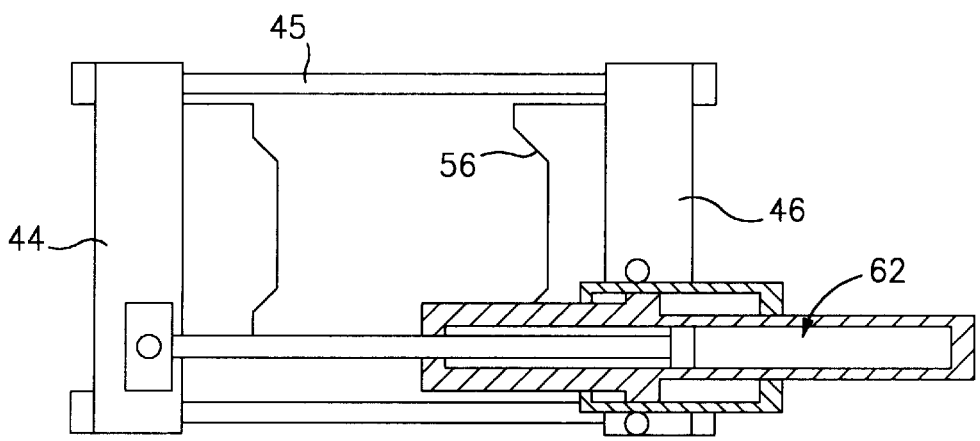

The operating cycle is shown in FIGS. 3–5, wherein movable platen 44 includes mold half 52 affixed thereto and stationary platen 46 includes mold half 54 affixed thereto which together form mold or molds 56. The platens are connected by tiebars 45.

FIG. 3 shows mold 56 in the mold clamped position. FIG. 4 shows mold 56 in the mold break position. FIG. 5 shows mold 56 in the mold open position. The mold clamped position of FIG. 3 shows the mold 56 closed with oil pressure applied at 58. The mold break position of FIG. 4 shows the mold 56 slightly open with oil pressure applied at 60. The mold open position of FIG. 5 shows the mold fully open with oil pressure applied at 62.

The present invention does not increase oil consumption during clamp opening and closing. Also since the mold break force acts directly on the movable platen during mold break at 57, the risk of the rod buckling is eliminated. Thus, the size of the stroke cylinder rod can be minimized.

An additional advantage of the present invention is that by separating the functions of mold stroke and mold break into two dedicated cylinders, the stroke adjustment for various mold shutheights is provided in the break cylinder and in the stroke cylinder, thereby shortening the build length of the clamp assembly.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims. For example, the mold break cylinder may if desired be mounted to the movable platen, and the stroke cylinder rod 32 could be attached to the stationary platen.

What is claimed is:

1. An apparatus for mold clamping, which comprises:

stationary and movable platens with a mold half affixed to each reciprocably movable between a mold open and mold closed position and between a mold closed and mold open position;

means for applying a mold stroke force to said movable platen to move the movable platen between the mold open and mold closed position, and between the mold closed and mold open position;

means separate from said means for applying a mold stroke force for applying a mold break force to said movable platen in the mold closed position to break open the mold;

wherein the means for applying a mold stroke force acts inside the means for applying a mold break force; and wherein the means for applying a mold stroke force includes a mold stroke cylinder with a mold stroke, and the means for applying a mold break force includes a mold break cylinder with a mold stroke, and wherein the mold stroke of the mold stroke cylinder is substantially larger than the mold stroke of the mold break cylinder.

2. An apparatus according to claim 1, wherein the stationary and movable platens have edge portions and wherein the means for applying a mold stroke force and means for applying a mold break force are mounted to the edge portions of said platens.

3. Apparatus according to claim 1, wherein the mold stroke of the mold stroke cylinder and the mold stroke of the mold break cylinder are in parallel.

4. Apparatus according to claim 3, wherein the mold break cylinder includes a piston with a piston face, and the mold stroke cylinder includes a piston with a piston face, and wherein the diameter of the piston face of the mold break cylinder is greater than the diameter of the piston face of the mold stroke cylinder.

5. Apparatus according to claim 4, wherein the diameter of the mold break piston is sized to provide mold break force, and the diameter of the mold stroke piston is sized to provide mold stroke force.

6. Apparatus according to claim 4, including dedicated cylinders for separating the functions of mold stroke and mold break.

7. Apparatus according to claim 1, wherein the mold stroke cylinder and mold break cylinder are concentric and coaxial.

8. Process for mold clamping, which comprises: providing stationary and movable platens with a mold half affixed to each reciprocably movable between a mold open and a mold closed position and between a mold closed and mold open position;

applying a mold stroke force to said movable platen by a mold stroke cylinder to move the movable platen between the mold open and mold closed position, and between the mold closed and mold open position;

applying a mold break force to said movable platen by a mold break cylinder which is separate from said mold stroke cylinder in the mold closed position to break open the mold;

positioning the mold stroke cylinder and the mold break cylinder so that the mold stroke cylinder acts inside the mold break cylinder; and including applying said mold stroke force with said mold stroke cylinder having a mold stroke and applying said mold break force with said mold break cylinder having a mold stroke, including the step of providing that the mold stroke of the mold stroke cylinder is substantially larger than the mold stroke of the mold break cylinder.

9. Process according to claim 8, including the step of providing that the stationary and movable platens have edge portions, and mounting said mold stroke cylinder and said mold break cylinder to the edge portions of said platens.

10. Process according to claim 8, including applying the mold stroke of the mold stroke cylinder in parallel with the mold stroke of the mold break cylinder.

11. Process according to claim 10, wherein the mold break cylinder includes a piston with a piston face, and the mold stroke cylinder includes a piston with a piston face, including in the step of sizing the diameter of the piston face of the mold break cylinder so that the diameter of the piston face of the mold break cylinder is greater than the diameter of the piston face of the mold stroke cylinder.

12. Process according to claim 11, including sizing the diameter of the mold break piston to provide mold break force, and sizing the diameter of the mold stroke piston to provide mold stroke force.

13. Process according to claim 11, including the step of separating the functions of mold stroke and mold break into two dedicated cylinders.

14. Process according to claim 10, including positioning the mold stroke cylinder and mold break cylinder in concentric and coaxial relationship.

* * * * *